Sept. 29, 1964     F. C. HUTTO     3,150,877
FABRICATED PISTON RING
Filed Dec. 2, 1960
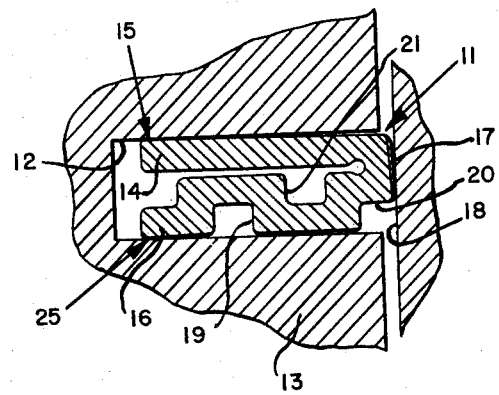
FRANK C. HUTTO
*INVENTOR.*
BY *John C. Faulkner*
*Thomas H. Oster*
ATTORNEYS

3,150,877
FABRICATED PISTON RING

Frank C. Hutto, Dearborn, Mich., assignor to Ford Motor Company, Dearborn, Mich., a corporation of Delaware
Filed Dec. 2, 1960, Ser. No. 73,407
3 Claims. (Cl. 277—213)

This invention relates generally to the piston ring art and more particularly to an improved lightweight fabricated steel piston ring.

Heretofore piston rings particularly of the compression type, have been for the most part of the type fabricated by casting a solid ring and providing the ring with a plated cylinder wall engaging surface. Rings of this type have been used for many years.

In the present invention, a piston ring is provided which has been fabricated of lightweight spring steel. This ring embodies built-in positive side sealing means against the associated sides of the ring groove to provide the necessary control against explosion blow-by. The present invention is an improvement over the fabricated steel piston rings disclosed in United States Letters Patent 2,569,778, issued to H. P. Phillips on October 2, 1951.

A piston ring made in accordance with this invention is particularly effective as the second compression ring. If appropriate venting is provided behind the piston ring compression groove, the piston ring located in that ring groove may be used for both compression and oil control purposes. Piston rings made in accordance with this invention may be used with or without expanders to control the outward compressive engagement of the piston ring against the cylinder wall.

It is the primary object of this invention, therefore, to provide a lightweight piston ring which is simple to manufacture, easy to assemble in the ring groove, and dependable in operation.

Another object of this invention is to provide a lightweight fabricated steel piston ring that may be used as a compression ring.

Still another object of this invention is to provide a lightweight fabricated steel piston ring that may be used as a combined compression and oil control ring.

Other objects and advantages of this invention will become more apparent when considered in connection with the accompanying drawing, wherein the single figure of the drawing is a fragmentary, enlarged, vertical sectional view taken through a compression ring groove of a piston of an internal combustion engine embodying this invention.

Referring now to the drawing, the lightweight fabricated steel piston ring 11 is shown which is generally circular in outline and parted at one side (not shown) in the usual manner. The fabricated steel piston ring 11 is assembled in an annular compression ring groove 12 of a piston 13. Fabricated steel piston ring 11 is produced from lightweight spring steel stock. It is provided with a radially disposed first flange 14 and a second flange 16 integrally connected at their peripheral edges by a cylinder wall engaging surface 17. Cylinder wall engaging surface 17 engages cylinder wall 18 in the usual manner. Second flange 16 is provided with a series of radially spaced steps indicated at 19, 20 and 21. Steps 19, 20 and 21 may be provided in this fabricated steel piston ring to give the fabricated steel piston ring a width greater than the normal ring width.

In the unassembled state, first flange 14 and second flange 16 are not in parallel relationship to each other. The first and second flanges 14 and 16 are slightly wider than the ring groove 12 at their free ends. When assembled in the ring groove 12, fabricated steel piston ring 11 is side sealed by line contact 15 between the inner edge of the first flange 14 and the associated side of the ring groove 12. The fabricated steel piston ring 11 is further side sealed by line contact 25 between the inner edge of the second flange 16 and the associated side of the ring groove 11.

First flange 14 and second flange 16 are capable of being bent about the cylinder wall engaging surface 17 for the purpose of assembling the fabricated steel piston ring 11 in the ring groove 12. It is to be noted that first flange 14 and second flange 16 are not parallel to each other and diverge radially inwardly in the assembled position in the ring groove 12.

The fabricated piston ring has been illustrated as being inserted in a compression ring groove of a piston. It is to be understood that the disclosed piston ring may be the only type of compression ring used or may be used in combination with a conventional compression ring. In addition, the disclosed ring may also be used to provide oil control by adequately venting the bottom of the ring groove to permit the return of oil that has been wiped from the cylinder wall to the oil sump.

It will be understood that this invention is not to be limited to the exact construction shown and described but that various changes and modifications may be made without departing from the spirit and scope of the invention as defined in the appended claims.

I claim:

1. An internal combustion engine comprising a cylinder wall, a piston having a relatively wide ring groove, a fabricated piston ring in said ring groove, said fabricated piston ring having at least a first flange, a second flange and a cylinder wall engaging surface integrally connecting said first and second flanges, each of said first and second flanges having a line contact with a side of the ring groove, and a plurality of steps in one of said flanges.

2. An internal combustion engine comprising a cylinder wall, a piston having a ring groove, a fabricated piston ring in said ring groove, said fabricated piston ring having at least a first flange, a second flange, and a cylinder wall engaging surface integrally connecting said first and second flanges, at least one flange on each side of the cylinder wall engaging surface having a line contact with a side of the ring groove, a plurality of steps in one of said flanges, said first and second flange being non-parallel to each other in the assembled position in said ring groove.

3. An internal combustion engine comprising a cylinder wall, a piston having a ring groove, a fabricated piston ring in said ring groove, said fabricated piston ring having at least a first flange, a second flange, and a cylinder wall engaging surface integrally connecting said first and second flanges, at least one flange on each side of the cylinder wall engaging surface having a line contact with a side of the ring groove, a plurality of steps in one of said flanges, said first and second flanges being non-parallel to each other and diverging radially inwardly in the assembled position in said ring groove.

References Cited in the file of this patent

UNITED STATES PATENTS

| 1,963,151 | Russell | June 19, 1934 |
| 2,091,947 | Cords | Aug. 31, 1937 |
| 2,387,854 | Phillips | Oct. 30, 1945 |
| 2,423,017 | Grant | June 24, 1954 |
| 2,867,482 | Schmidt | Jan. 6, 1959 |

FOREIGN PATENTS

| 59,835 | France | Feb. 24, 1954 |
| 792,922 | Great Britain | Apr. 9, 1958 |